3,677,702
NITROGEN FIXATION

Leroy H. Wullstein, Salt Lake City, Utah, assignor to University of Utah
No Drawing. Filed July 30, 1969, Ser. No. 846,278
Int. Cl. C01c 1/00, 21/00
U.S. Cl. 23—193          10 Claims

ABSTRACT OF THE DISCLOSURE

A method of nitrogen fixation by purely chemical means rather than biochemical means, wherein a gaseous phase comprising molecular nitrogen is contacted with an aqueous system comprising ferrous iron and a nitrite to form ammonium radical ($NH_4$) and molecular nitrogen. The reaction takes place either at room temperature and pressure, or at greater temperatures and pressures, and can utilize air as the source of gaseous nitrogen.

---

Historically, the fixation of nitrogen nonenzymatically has been a relatively expensive process by reason of the high temperatures and pressures involved, or the expensive catalytic compounds required for the process. Ammonia, or more particularly the fixation of nitrogen into ammonium radical ($NH_4$), has largely been responsible for the growth of the synthetic chemical industry in many areas such as explosives and fertilizer manufacture. Since nitrogen fixation is of such importance to the synthetic chemical industry, an inexpensive means of nitrogen fixation would prove to be a useful and valuable invention. Such an invention is herein disclosed.

The present invention utilizes relatively inexpensive compounds in an aqueous solution for the fixation of nitrogen from a gaseous phase wherein the reaction takes place either at room temperature and atmospheric pressures or at greater temperatures and pressures as the requirements of the process may dictate. The compounds involved in the aqueous solution are a ferrous iron compound and a nitrite compound. Almost any number of compounds may be used to furnish the ferrous iron and the nitrite but the inventive concept disclosed herein is the use of ferrous iron in combination with a nitrite both of which are disposed within an aqueous system.

The nitrogen contacted with the aqueous system can be either the nitrogen content of air contacted with the system or a gaseous phase of higher nitrogen concentration. It is suggested that gaseous phases containing higher concentrations of nitrogen contacted with the aqueous system will produce a faster fixation reaction than that of a gaseous phase comprising air alone.

Increased temperatures and pressures should also serve to speed the reaction which results in the fixation of the gaseous nitrogen into ammonium radical ($NH_4$) and molecular nitrogen.

Preliminary data indicate $N_2^{30}$, $N_2^{29}$, and $N^{14}H_3$ are products of reacting gaseous $N_2^{28}$ with $NaN^{15}O_2$ and $FeSO_4$ in the aqueous system. Molecular nitrogen in the form of $N_2^{29}$ and $N_2^{30}$ was detected in the aqueous phase and as evolved products in the components of the experimental gaseous phase. Treatment of the aqueous phase with NaOH caused the evolution of $N^{14}H_3$ which was then detected as an evolved product.

Since $N^{15}H_3$ was not detected it is concluded that either $N^{15}O_2^-$—N was not reduced to the level of $N^{15}N_4^+$ or that the latter did not accumulate in detectable amounts.

$N^{14}H_3$ and $N_2^{30}$ appear to be reaction products of $N_2^{28}$ fixation and $N^{15}O_2$ reduction respectively. $N_2^{29}$ appears to be derived from interaction between $N^{15}O_2^-$ and $N_2^{28}$ and/or $N^{14}H_4^+$.

The foregoing preliminary data collected by studies conducted with different isotopes of nitrogen demonstrates that nitrogen from the gaseous phase is fixed into the aqueous phase by the action of the ferrous ions and nitrite ions in the aqueous phase, and, further, that the fixed nitrogen is not a result of the decomposition of the nitrite ions.

Although the actual chemical phenomena of the fixation reaction is unknown, it is suggested that an electron transport mechanism associated with surface phenomena of a transition metal such as iron is in operation.

Experimentally, 300 micrograms of nitrogen as ammonium radical ($NH_4$) were obtained from contacting a gaseous phase comprising primarily nitrogen with an aqueous system comprising 5,000 p.p.m. ferrous ion ($Fe^{++}$) introduced in the form of ferrous sulfate ($FeSO_4$) and 1,000 p.p.m. nitrite ion ($NO_2^-$) introduced in the form of sodium nitrite ($NaNO_2$). The reaction, in this instance, occurred at approximately 28° C. and under atmospheric pressure. Although the effect of light upon the reaction was not measured, it was found that the reaction did proceed in either the presence of light or in its absence. Presumably electromagnetic radiation of the visible spectrum, more particularly that in the ultraviolet range, would cause the reaction to proceed more rapidly as in other well known chemical reactions.

In the above experiment, helium was used as the other component of the gaseous phase; however, oxygen could be used although it does tend to slow the reaction to some degree.

In addition to the formation of ammonium radical ($NH_4$) molecular nitrogen was obtained along with oxides of nitrogen (NO and $NO_2$) as reaction products. The oxides of nitrogen were found by isotope studies to have come from the nitrite in the aqueous system.

The nitrite of the aqueous system is generally introduced in the form of a nitrite of an alkali metal or an alkaline earth metal. Since sodium and potassium nitrite have higher dissociation constants than the other alkali metal or alkaline earth metal nitrite salts, it would appear that lesser quantities of these salts would be required since they will provide greater amounts of nitrite ions in solution per mole of salt than the other nitrite salts.

I claim:

1. A method of producing ammonium radical ($NH_4$) and molecular nitrogen in an aqueous system nonenzymatically, nitrogen for said ammonium radical ($NH_4$) and said molecular nitrogen being supplied from molecular nitrogen in a gaseous phase, said method comprising the step of contacting said gaseous phase with said aqueous system wherein said aqueous system comprises ferrous ions and nitrite ions.

2. The method of producing ammonium radical ($NH_4$) and molecular nitrogen nonenzymatically as defined in claim 1 wherein said ferrous ions are introduced in the aqueous system in the form of ferrous sulphate and ferrous chloride either singly or in combination.

3. The method of producing ammonium radical ($NH_4$) and molecular nitrogen nonenzymatically as defined in claim 1 wherein the nitrite is present in the aqueous system in the form of an ion of an alkaline earth metal nitrite.

4. The method of producing ammonium radical ($NH_4$) and molecular nitrogen nonenzymatically as defined in claim 3 wherein the alkaline earth metal nitrite is in the form of barium nitrite, strontium nitrite, magnesium nitrite, and calcium nitrite either singly or in combination.

5. The method of producing ammonium radical ($NH_4$) and molecular nitrogen nonenzymatically as defined in claim 1 wherein the nitrite is present in the aqueous system in the form of an ion of an alkali metal nitrite.

6. The method of producing ammonium radical ($NH_4$) and molecular nitrogen nonenzymatically as defined in claim 5 wherein the alkali metal nitrite in the aqueous system is present in the form of sodium nitrite, lithium nitrite, and potassium nitrite either singly or in combination.

7. The method of producing ammonium radical ($NH_4$) and molecular nitrogen nonenzymatically as defined in claim 1 wherein the gaseous phase is air.

8. The method of producing ammonium radical ($NH_4$) and molecular nitrogen nonenzymatically as defined in claim 1 wherein the nitrogen content of the gaseous phase varies between that of air to 100 percent nitrogen.

9. In a method of producing ammonium radical ($NH_4$) and molecular nitrogen nonenzymatically as defined in claim 1 wherein the temperature of the system is approximately 28° C. and under atmospheric pressure.

10. In a method of producing ammonium radical ($NH_4$) and molecular nitrogen nonenzymatically as defined in claim 1 wherein the pressure exerted upon the system is within the range on the order of about 1 atm. to 2 atm.

References Cited
UNITED STATES PATENTS 1,548,345  8/1925  Bindschedler _____ 23—193

OSCAR R. VERTIZ, Primary Examiner

H. S. MILLER, Assistant Examiner

U.S. Cl. X.R.

23—220